Oct. 23, 1923.

H. P. CHANDLER 1,471,546

CONDUCTOR SUPPORT

Filed June 18, 1923

Inventor
HOMER P. CHANDLER.

G. G. Allenbaugh

By

Attorney

Patented Oct. 23, 1923.

1,471,546

UNITED STATES PATENT OFFICE.

HOMER P. CHANDLER, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed June 18, 1923. Serial No. 646,191.

*To all whom it may concern:*

Be it known that I, HOMER P. CHANDLER, a citizen of the United States of America, residing at Mansfield, in the county of Richland and State of Ohio, have invented certain new and useful Improvements in Conductor Supports, of which the following is a specification.

My invention relates to supports for conductors and particularly that class of supports called trolley wire clamps.

The object of my invention is to produce a clamp which will support a trolley wire or other conductor from a hanger or other support, and which can be made to grip or release the conductor by moving the jaws into or out of engagement with the conductor and which is alinable with respect to the conductor after having been installed upon the hanger or other support.

My invention resides in the new and novel construction or arrangement of the various parts more fully hereinafter described and illustrated in the accompanying drawing.

Figure 3:
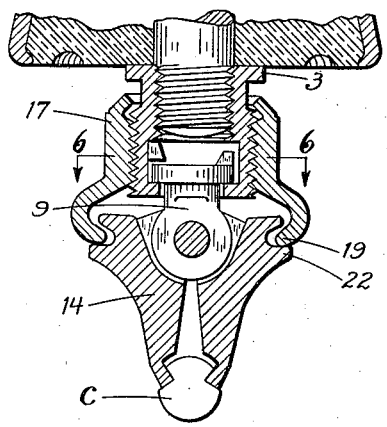
Fig. 3 is a sectional view taken on the line 3—3 of Fig. 1, but shows in addition the clamp as secured to an overhead hanger.
Figure 5:
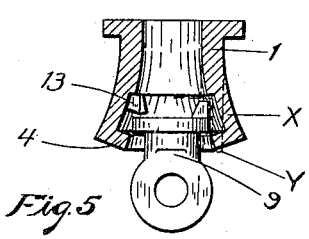
Fig. 5 shows a detail of construction of the supporting members fully explained hereinafter.

In the preferred form of my invention I employ a supporting member 1 internally threaded to receive a threaded stud 2 of the hanger H. The upper end of the supporting member 1 is provided with a flange 3 and an inwardly projecting flange 4 and an exteriorly threaded portion 5. The lower end of the supporting member 1 is provided with a recess 6 having an opening 7. Mounted within the recess 6 is the head 8 of an intermediate member 9. The lower end of the intermediate member 9 is provided with one or more projecting lugs 10 provided with an opening in which is positioned a pin 11. The head 8 has secured thereto a lug 12 adapted to engage a lug 13 within the recess 6 of the member 1. The intermediate member 9 is rotatable relatively to the supporting member 1 and is limited only by the engagement of the lug 12 with the lug 13. One method of securing the parts 1 and 9 together is to form the supporting member 1 opened or expanded at the lower end that is easily done in the art of casting, and then inserting therein the member 9 (see Fig. 3) and then by means of proper tools such as dies, presses, etc. the lower end of the member 1 is forced inwardly thereby securely locking the members 1 and 9 together in limited relative rotation. In Fig. 3 the heavy lines indicate the method in which the member 1 may be originally formed at the point X, and the dotted lines Y show the condition of the member 1 after the same has been operated upon to lock the parts 1 and 9 together.

Pivotally secured to the intermediate member 9 are two jaws 14 each provided with a lip 15 arranged to engage and grip a trolley wire or other conductor C. Each jaw is also provided with a lug 16 which lugs coact with the lugs 10 and are held in relative operative relation thereto by means of the pin 11. The jaws 14 can pivot relatively to the intermediate member 9 about the axis of the pin 11, but can not rotate otherwise relatively to the intermediate member 9. It will be evident therefore, that if the jaws 14 are gripped and rotated that the member 9 must rotate simultaneously and in the same direction, and if the rotation is carried sufficiently far in either direction the lug 12 will engage with the lug 13 and the rotation of the jaws will either be stopped or the member 1 will be caused to rotate in the same direction. It will also be evident that the jaws are supported from the supporting member 1 by means of the intermediate member 9.

Threadably mounted upon the exteriorly threaded portion 5 of the supporting member 1 is an operating member 17 which will rotate relative to the member 1 and simultaneously move in either axial direction. The operating member 17 is provided with an upwardly and inwardly projecting flange 18 which originally was formed projecting upwardly as shown by the dotted lines 18' and which is later turned inwardly as hereinafter more fully explained. The operating member 17 is provided with an inwardly projecting annular flange 19 adapted to engage a groove 20 in each jaw 14. The groove 20 is formed by the upper lug 21 and the lower lug 22. It will be evident that as the member 17 is rotated that it will move upwardly or downwardly along the vertical axis and in so moving will cause the jaws 14 to be opened or closed depending upon the direction of movement of the member 17. If the member 17 is moved downwardly the flange 19 will engage the lug 22 on each of the jaws and force the jaws into engagement with the trolley wire. If the operating member 17 is moved upwardly the flange 19 will engage the lug 21 on each of the jaws and move the jaws out of engagement with the trolley wire or open them to receive a trolley wire. It will also be evident that whether the jaws are moved into or out of engagement with the trolley wire C that they are permanently held in either an open or closed relation with respect to the trolley wire due to the novel interlocking of the parts 14 and 17.

Figure 1:
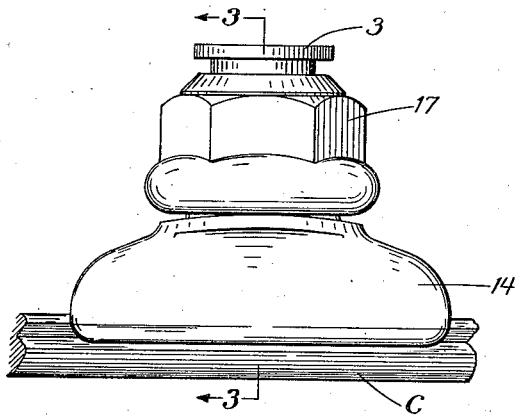
Fig. 1 is a side plan view of my invention shown as secured to a trolley wire.
Figure 2:
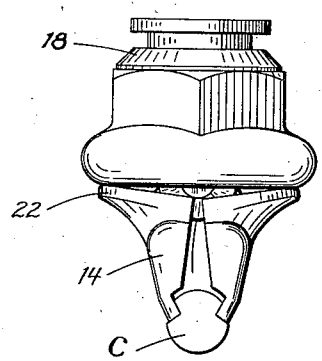
Fig. 2 is an end view of Fig. 1.
Figure 4:
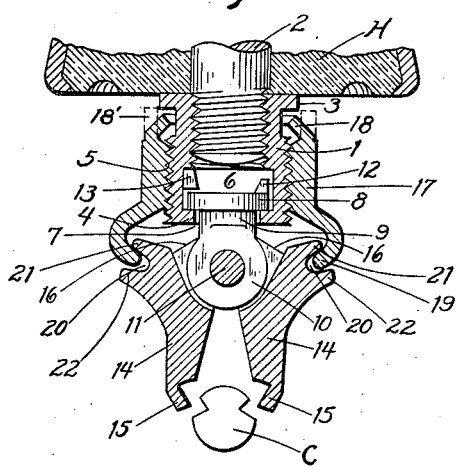
Fig. 4 is a view of Fig. 3, excepting that the jaws are shown in an opened position ready to receive a trolley wire.

In assembling the various parts of my invention the members 1 and 9 are first assembled as herein described or by other methods after which the member 17 is threaded on to the member 1 and as the flange 18 projects upwardly as indicated by 18' the member 17 can be threaded on to the member 1 to a much greater distance than shown in Fig. 4. This will permit the jaw members 14 to be positioned in place and the pin 11 inserted in position. The operating member 17 is then rotated and moved downwardly on the member 1 a distance sufficient and the upstanding flange 18' is rolled or swaged inwardly as shown by the numeral 18 after which operation it will be impossible for the operating member 17 to be raised a sufficient distance to permit the pin 11 to be withdrawn as the flange 18 will engage the flange 3 before the flange 19 has raised above the upper edge of the pin 11.

In the installation of my invention the hanger H is presumed to be positioned in place and the clamp is then taken and by means of the jaws 14 rotated into the position shown in Fig. 3. Rotation of the member 1 is brought about as previously described and if the jaws 14 do not aline with the trolley wire C it is then possible to back off the jaws until the lips 15 aline with the trolley wire. The alinement having been brought about, the trolley wire is held in position between the jaws manually and the operating member 17 rotated in the proper direction to move the lips 15 toward each other until they grip the conductor. A wrench or other tool then applied to the operating member 17 will force the jaws into a secure gripping engagement with the trolley wire and hold the trolley wire securely.

Figure 6:
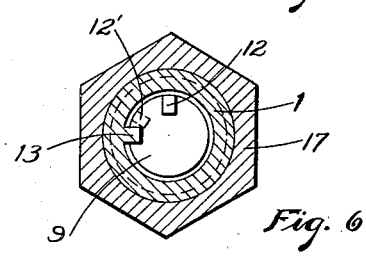
Fig. 6 is a sectional view on the line 6—6 of Fig. 3, showing a way of securing a limited relative rotation of the two supporting members shown in Fig. 5.

In Fig. 6 is shown by relation of the lugs 13 and 12' how the lugs are related when the part 1 is being rotated by means of the part 9, and the relation shown by the lugs 12 and 13 indicate the position which may be taken by the lugs after the jaws have been reversely rotated in order to aline the jaws with the trolley wire.

By omitting the lugs 12 and 13 the jaws and member 9 are made to rotate relative to the member 1 without limit and in that case the device can be secured to a hanger by the application of a wrench to the flange 3.

There are undoubtedly modifications which will be apparent to those skilled in the art, therefore, I do not wish to be limited otherwise than by my claims.

I claim:

1. A conductor clamp comprising supporting means to secure the clamp to a hanger, gripping means to engage a conductor, operating means mounted on the supporting means and movable longitudinally thereof in opposite directions and engaging the gripping means to operate the same, intermediate means secured to the gripping means and the supporting means to secure the gripping means to the supporting means in rotatable relation thereto and means to secure the gripping means to the intermediate means in pivotal relation thereto.

2. A conductor clamp comprising supporting means to secure the clamp to a hanger, gripping means to engage a conductor, operating means mounted on the supporting means and movable longitudinally thereof in opposite directions and engaging the gripping means to operate the same, intermediate means secured to the gripping means and the supporting means to secure the gripping means to the supporting means in limited rotatable relation thereto and means to secure the gripping means to the intermediate means in pivotal relation thereto.

3. A conductor clamp comprising a supporting means, gripping means to engage a conductor, an intermediate member secured to the supporting member and the gripping means in rotatable relation to the supporting member and operating means rotatably mounted on the supporting means to move the gripping means either into or out of engagement with the conductor.

4. A conductor clamp comprising a supporting means, gripping means to engage a conductor, an intermediate member secured to the supporting member and the gripping means in rotatable relation to the supporting member, means on the intermediate member engaging means on the supporting means to limit the relative rotation of the intermediate member and the supporting means.

5. A conductor clamp comprising a supporting means, a rotatable operating member mounted on the supporting means, a rotatable intermediate member mounted on the supporting means and a conductor, gripping means pivotally mounted on the operating and intermediate members.

6. A conductor clamp comprising a supporting means, a rotatable operating member mounted on the supporting means, a rotatable intermediate member mounted on the supporting means, a conductor gripping means mounted on the intermediate member and moved either into or out of engagement with the conductor when the operating member is rotated.

7. A conductor clamp comprising supporting means to secure the clamp to a hanger, a conductor gripping means, a rotatable intermediate member mounted on the supporting means, means to secure the gripping means to the intermediate member and operating means threadedly mounted on the supporting means to either open or close the gripping means.

8. A conductor clamp comprising supporting means to secure the clamp to a hanger, a conductor gripping means, a rotatable intermediate member mounted on the supporting means, means to limit the rotation of the intermediate member relative to the supporting member, means to secure the gripping means to the intermediate member and operating means threadably mounted on the supporting means to either open or close the gripping means.

9. A conductor clamp comprising supporting means to secure the clamp to a hanger, a conductor gripping means, a rotatable intermediate member mounted on the supporting means, means to secure the gripping means to the intermediate member and operating means threadably mounted on the supporting means to close the gripping means.

10. A conductor clamp comprising supporting means to secure the clamp to a hanger, a conductor gripping means, a rotatable intermediate member mounted on the supporting means, means to limit the rotation of the intermediate member relative to the supporting member, means to secure the gripping means to the intermediate member and operating means threadably mounted on the supporting means to close the gripping means.

11. A conductor clamp comprising means to secure the clamp to a hanger, a pair of jaws to grip a conductor, means to permit a limited rotation of the jaws relative to the securing means and means to move the jaws either into or out of engagement with the conductor.

In testimony whereof I affix my signature.

HOMER P. CHANDLER.